United States Patent Office 3,793,425
Patented Feb. 19, 1974

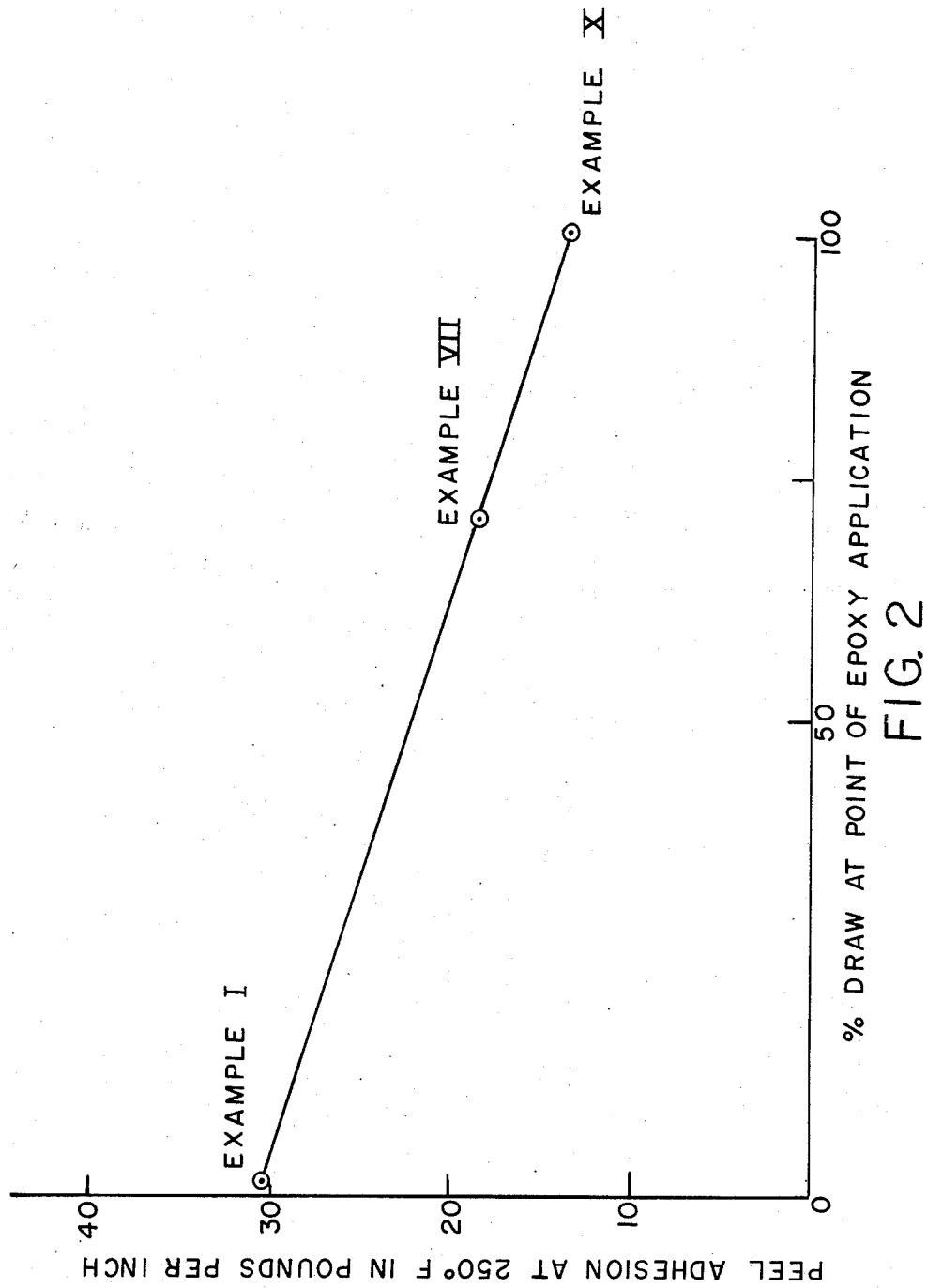

3,793,425
COATING PROCESS FOR POLYESTER SUBSTRATES
Robert J. Arrowsmith, 6214 Rose Valley Drive, Charlotte, N.C. 28210
Continuation-in-part of abandoned application Ser. No. 878,497, Nov. 20, 1969. This application Dec. 27, 1971, Ser. No. 212,043
Int. Cl. D01d 5/12
U.S. Cl. 264—210 F       4 Claims

ABSTRACT OF THE DISCLOSURE

A process for pre-treating polyester filamentary material for subsequent rubber adhesion, the process comprising extruding a polyester filamentary material capable of being drawn and before the extrudate is fully drawn, coating with a composition containing an epoxy resin.

---

This is a continuation-in-part of application Ser. No. 878,497 filed Nov. 20, 1969 and now abandoned.

This invention relates to a method for improving the adhesion of a polyester reinforcing element to a rubbery composition, and more specifically, to improving the adhesion of polyester cord to a rubbery composition in the manufacture of reinforced rubber goods.

The majority of rubber goods articles requiring high tensile strength are reinforced with textile materials. For rubber goods articles such as for instance, pneumatic tires, continuous belts, industrial brake diaphragms, bridge pads and the like reinforcing textile elements, are primarily selected from rayon, nylon and polyester textile elements. While rubber adhesion difficulties for rayon and nylon have largely been resolved, polyester textile elements generally exhibit poor rubber adhesion. However, in view of the exceptional strength of polyester fibers, polyester has still found wide acceptance as a reinforcing element in rubber goods.

One system for improving the adhesion of polyester reinforcing elements to rubber is by treating the surface of the polyester reinforcing element with a polyepoxide. The epoxide coated polyester reinforcing element is then treated with an aqueous dispersion containing a combination of the resorcinol-formaldehyde precondensate and a vinyl pyridine latex. The primary difficulty with this prior art procedure resides in the processing difficulties encountered in the initial polyepoxide coating operation itself, as well as in product adhesion which is usually not equal to that adhesion which can be obtained with either rayon or nylon reinforcing elements. The prior art processes for treating the surface of a polyester reinforcing element with a polyepoxide have either involved the application of an epoxide resin composition containing a curing agent, or alternatively, the application of epoxy resin in a first bath, followed by a second bath containing an epoxy resin curing agent, or more recently, the application of an epoxy resin in the absence of a curing agent, the epoxy resin being applied to a fully drawn yarn. Each one of these prior art processes is subject to certain deficiencies, for instance, when an epoxy curing agent is employed directly in an epoxy resin containing coating bath, the epoxy resin and curing agent in the bath react to form a solid polymer which will deposit out and eventually block the pipes and valves of the bath supply system. This is particularly serious on a spinning process where the finish can be subjected to elevated temperatures (60° C.) for considerable periods before being applied to the yarn. The second problem with these catalyzed adhesive primers when used in conjunction with a spinning process is that part of the cured (or partially cured) epoxy resin is transferred from the yarn to the hot rolls or hot plate of the drawing equipment where it forms a deposit. These deposits must be removed frequently or they will build up and cause a decrease in polymer to yarn conversion efficiency. Two further problems are encountered when the curing agent is an amine curing agent. First, amines degrade polyester and their use in the adhesive primer could result in a lowering of the yarn thermal stability. Also, amines are highly toxic and required stringent handling precautions.

When plural baths are employed, that is to say, when an epoxy resin alone is used in the first coating bath, and a curing agent for the epoxy resin is employed in a second coating bath, processing costs are greatly increased and moreover, the contamination of the second bath by the epoxy material from the first bath eventually results in a process having the same difficulties as that process which employs a single bath containing both epoxy resin and curing agent. While it is suggested that epoxy resins will cure in the absence of curing agents, prior art processes such as that outlined in U.S. Pat. No. 3,247,043 which cost fully drawn yarn with epoxy resins in the absence of curing agents, have not produced products which exhibit that degree of adhesion for rubber which has already been achieved in rayon and nylon reinforcing elements.

It is therefore an object of this invention to provide a process for pretreating polyethylene terephthalate extrudates in order to render the extrudate amenable to being adhered to rubber.

It is another object of this invention to provide a process for preparation of polyethylene terephthalates filaments which are suitable for use in the preparation of reinforced rubber goods.

It is still another object of this invention to provide a superior poleythylene terephthalate filament adhesive primer treatment prior to a resorcinol-formaldehyde, vinyl pyridine latex coating.

These and other objects of the invention will become more apparent from the following detailed description.

In accordance with this invention, it has now been discovered that an improved adhesive primed polyester reinforcing element may be prepared by the application of an epoxy resin without a curing agent to undrawn yarn, followed by normal heating, drawing, and relaxation steps, commonly employed to obtain desired properties in the extrudate. The combination of heat treating and drawing are the only processing steps required prior to dipping, if so desired, the adhesive primer polyester in a resorcinol-formaldehyde-latex bath. Preferably, the epoxy resin is buffered so as to have an alkaline pH, the alkaline pH apparently rendering the adhesion less sensitive to heat aging.

The term "undrawn yarn" as employed herein includes any yarn which is less than fully drawn. The most preferred polyester substrate for coating with epoxy resin is freshly spun polyester yarn in its as extruded or undrawn condition whereby greater amounts of virgin surface are exposed. However, all of the polyester yarns for use in conjunction with this invention must be capable of being hot drawn at least 1.2 times along the length and preferably at least 2 times along the length subsequent to application of the epoxy resin so as to expose virgin surface.

The term "polyester" as employed herein is deemed to include any highly polymeric linear ester obtained by heating one or more glycols of the series $HO(CH_2)_nOH$ where $n$ is greater than 1 but not exceeding 10, with a dicarboxylic and preferably terephthalic acid or an ester forming derivative thereof. The phrase "highly polymeric linear esters" may be defined as polyesters which are capable of molecular orientation as shown by characteristic X-ray patterns, by drawing or rolling. Examples of ester-forming derivatives of terephthalic acid are its aliphatic (including cycloaliphatic) and aryl esters and half-esters, its acid halides and its ammonium and amine salts. Examples of the said glycols are ethylene, trimethylene, tetramethylene, hexamethylene and decamethylene glycols. The preferred polyester for purposes of this invention is polyethylene terephthalate. The improved adhesion obtained according to the teachings of this invention may be obtained with all polyethylene terephthalate polymers regardless of their carboxyl end groups content or diethylene glycol content. The effect of coating an underdrawn yarn is to increase the virgin surface of the substrate and thereby provide the desirable result of the invention.

Any epoxy resin having more than one epoxide group per molecule is suitable for use in conjunction with this invention. More specifically, three classes of epoxy resins have been found to be especially suitable, these resins being aliphatic glycidyl ether, aromatic glycidyl ether and aromatic glycidyl ester. The most preferred class of epoxy resins are those with a weight per epoxide of 200 or less and a molecular weight of less than 500. These ranges are based on requirements of the process and not on the adhesion obtainable. High molecular weight resins are insoluble in water and difficult to emulsify. With high weights per epoxide, high concentrations of resins on yarn would be required to give sufficient epoxide groups on yarn for adhesion. These high on yarn concentrations would be difficult to obtain and would result in build-up resin and finish on the hot rolls or plates of the drawing equipment.

The adhesive primer has been described as an epoxy resin, this being the only component required for improved adhesion. However, in practice, it is usually necessary to apply a yarn lubricant (spin finish) to the spun yarn before drawing, and it is most convenient to apply this lubricant and the epoxy resin simultaneously. This can be achieved by applying the epoxy resin and lubricant as an aqueous solution, or if either component is not soluble, as an emulsion in water using for instance, a finish roll for the finish application. If desired, the epoxy resin and lubricant can be applied separately to the spun yarn. Any yarn lubricant suitable for use on the spin draw or spun yarn/draw twist process can be used, that is to say, heat stable lubricants giving low fiber to metal friction. The addition of an emulsifier may be required to form the emulsion; antifoams and bacteriastats and antistats may also be added to the spin finish.

The present adhesive primers do not contain a curing agent and the problems associated with the epoxy resin/curing agent primers (polymerization of the primer/spin finish and roll deposition, etc. see above) do not occur with these primers.

As previously mentioned, the polyether and polyester polyepoxide to be used in the process of this invention comprise those compounds possessing a plurality of 1,2-epoxy groups (i.e.,

groups). These polyether or polyester polyepoxides, more detailed description of which appears in U.S. Pat. No. 2,829,071, may be saturated or unsaturated, aliphatic, cycloaliphatic, aromatic or heterocyclic and may be substituted if desired with various substituents, such as halogen atoms, hydroxy groups, ether radicals, and the like. They may also be monomeric or polymeric.

Polyether polyepoxides to be used in the process of the invention may be exemplified by 1,4-bis(2,3-epoxypropoxy)benzene; 1,3-bis(2,3-epoxypropoxy)benzene; 4,4'-bis(2,3 - epoxypropoxy)diphenyl ether; 1,3 - bis(2,3-epoxypropoxy)octane; 1,4-bis(2,3 - epoxypropoxy)cyclohexane; 4,4'-bis(2-hydroxy - 3,4 - epoxybutoxy)diphenyldimethylmethane; 1,3-bis(4,5-epoxypentoxy) - 5 - chlorobenzene; 1,4-bis(3,4-epoxybutoxy)2 - chlorocyclohexane; ethylene glycol diglycidyl ether, resorcinol diglycidyl ether, and 1,2,3,4-tetra(2-hydroxy - 3,4 - epoxybutoxy)

Other examples include the glycidyl polyethers of polyhydric phenols obtained by reacting a polyhydric phenol with an excess, e.g., 4 to 8 mole excess of a chlorohydrin, such as epichlorohydrin and dichlorohydrin. Other polyhydric phenols that can be used for this purpose include resorcinol, catechol, hydroquinone, methyl resorcinol, polynuclear phenols, such as 2,2-bis(4-hydroxyphenyl) butane; 4,4' - dihydroxybenzophenone; bis(4 - hydroxyphenyl)ethane; and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein, the expression "polyhydric alcohol" is meant to include those compounds having at least two free alcoholic OH groups and includes the polyhydric alcohols and their ethers and esters, hydroxyaldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, sorbitol, mannitol, inositol, trimethylolpropane, bis(4-hydroxycyclohexyl) dimethylmethane, 1,4-dimethylolbenzene, 4,4-dimethyloldiphenyl, dimethylol toluenes and the like. The polyhydric ether alcohols include, among others, diglycerol, triglycerol, di-pentaerythritol, tripentaerythritol, dimethylolanisoles, beta hydroxyethyl ethers of polyhydric alcohols, such as diethylene glycol, polyethylene glycols; bis (beta hydroxyethyl ether) of hydroquinone; bis(beta hydroxyethyl ether) of bisphenol; beta hydroxyethyl ethers of glycerol, pentaerythritol; sorbitol; mannitol; etc.; condensates of alkylene oxides, such as ethylene oxide; propylene oxide; butylene oxide; isobutylene oxide; glycidol; epichlorohydrin; glycidyl ethers, etc. with polyhydric alcohols, such as the foregoing and with polyhydric thioethers, such as 2,2'-dihydroxydiethyl sulfide; 2,2',-3,3'-tetrahydroxy dipropyl sulfide, etc. The hydroxyaldehydes and ketones may be exemplified by dextrose, fructose, maltose, glyceraldehyde. The mercapto (thiol) alcohols may be exemplified by alpha-monothioglycerol, alpha, alpha'-dithioglycerol, etc. The polyhydric alcohol esters may be exemplified by monoglycerides, such as monostearin, monoesters of pentaerythritol and acetic acid, butyric acid, pentanoic acid and the like. The halogenated polyhydric alcohols may be exemplified by the monochloride or pentaerythritol, monochloride of sorbitol, monochloride of mannitol, monochloride of glycerol, and the like.

Other polyether polyepoxides include the polyepoxy-polyhydroxy polyethers obtained by reacting, preferably in an alkaline medium, a polyhydric alcohol or polyhydric phenol with a polyepoxide, such as the reaction product of a glycidyl ether of a polyhydric phenol with the same or different polyhydric phenol, the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxy propyl) ether, and the reaction product of catechol and bis(2,3-epoxypropyl) ether.

A group of polymeric-type polyether polyepoxides comprises the hydroxy-substituted polyepoxide polyethers obtained by reacting preferably, in an alkaline medium, a slight excess, e.g., .5 to 3 mole excess, of a halogen-containing epoxide, such as epichlorohydrin, with any of the aforedescribed polyhydric phenols, such as resorcinol, catechol, 2,2-bis(4'-hydroxyphenyl) propane, bis[4-(2'-hydroxynaphth - 1 - yl)-2,2-hydroxynaphth-1-yl] methane and the like.

Other polymeric polyether polyepoxides include the polymers and copolymers of the allylic ether of epoxy containing alcohols. When this type of monomer is polymerized in the substantial absence of alkaline or acidic catalysts, such as in the presence of heat, oxygen, peroxy compounds, actinic light, and the light, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl etherstyrene copolymer, methallyl 3,4-epoxybutyl ether-allyl, benzoate copolymer poly(vinyl 2,3-epoxypropyl) ether and allyl glycidyl ethervinyl acetate copolymer.

Polyester polyepoxides suitable for use in the process of this invention include polyglycidyl esters of aliphatic and aromatic dicarboxylic acids such as for instance, diglycidylorthophthalate, diglycidylisophthalate, diglycidyladipate, diglycidylazelate and diglycidyl ester of hexahydrophthalic acid.

Buffering agents which are suitable for achieving an alkaline pH in the epoxy resin coating composition are those buffering agents which are substantially devoid of catalytic effects on the epoxy resin. Buffering agents which have been found to be especially suitable for use in conjunction with this invention are buffering agents selected from the group consisting of sodium carbonate, lithium carbonate, potassium carbonate and ammonium hydroxide.

A better understanding of the invention may be had from a discussion of the drawings wherein:

FIG. 2 is a graph plotting adhesion against degree of draw at the point of epoxy resin application.

Figure 1:
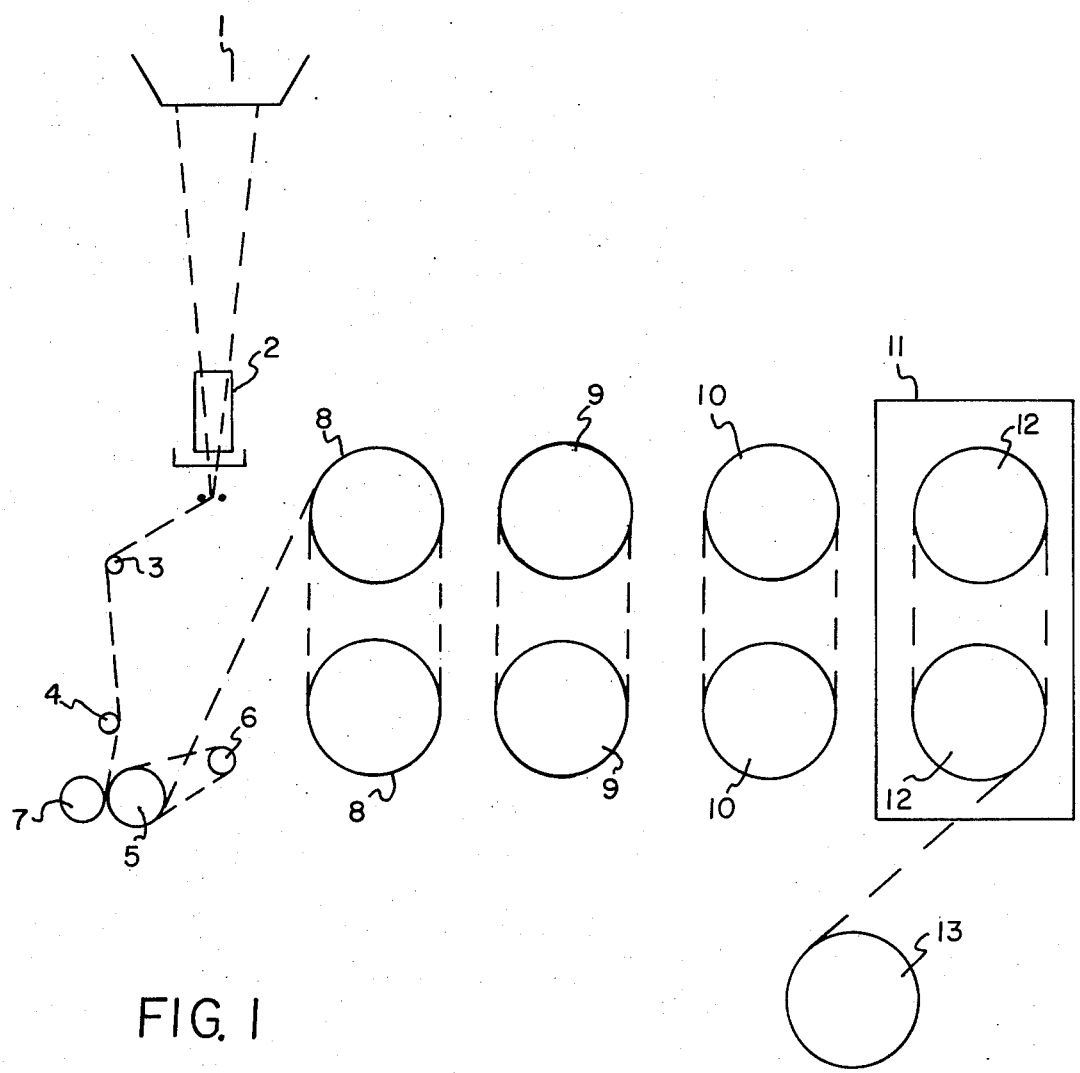
FIG. 1 is a schematic illustration of a spin draw process as employed in conjunction with the adhesive priming process of this invention.

The following specific examples are illustrative of prior art processes and of the adhesive priming process of this invention as employed in the spin draw processes as illustrated in FIG. 1. It should be understood however, that the examples are given for purpose of illustration and should not be considered as limiting the spirit or scope of this invention.

EXAMPLE I

1330/192 polyester tire yarn is made using the continuous spin draw process illustrated in FIG. 1. Turning to FIG. 1, it can be seen that a continuous spin draw process is carried out by extruding polyester polymer of suitable melt viscosity into a finish roll and tray assembly 2, the tray containing the epoxy resin finish of this invention. The undrawn yarn is passed over first idler roll 3 and then over second idler roll 4 and then around pretensioning rolls 5 and 6 equipped with nip roll member 7. The yarn is then passed around a heated pair of feed rolls 8 and then around a first pair of draw rolls 9. From the first pair of draw rolls, the yarn is passed around a second pair of draw rolls 10 and then into a heated chamber 11 containing a third pair of draw rolls 12, rolls 12 and chamber 11 being maintained at a higher temperature than the first and second pairs of draw rolls. After the final draw, the yarn is taken up on wind-up unit 13. The finish composition placed in the tray of the finish roll and tray assembly 2 is as follows:

5% glycidyl ether made from epichlorohydrin and glycerine (epoxide equivalent 140–160)
5% spin finish containing approximately 60% of dimethylpolysiloxanes (average molecular weight 2000)
5% spin finish containing 75% ethoxylated sorbitan monooleate (20 moles polyoxyethylene) and 25% ethoxylated octophenol (12 moles polyoxyethylene)
85% water The resultant yarn is twisted to give a 3 ply 8 x 8 cord which was resorcinol formaldehyde latex dipped and heated at 300° F. for 130 seconds and 435° F, for 70 seconds. The dipped cord was made into a 1" peel using commercial pneumatic tire green rubber and rubber cured at 325° F. for 15 minutes. These peels gave the following adhesion results: 75° F., 59 lb./in. 3+; 250° F., 30 lb./in. 3. The adhesive strength of the epoxy primer polyester and the epoxy primer resorcinol formaldehyde latex dip bonds may therefore be considered as at least equal to the cohesive strength of rubber.

EXAMPLE II

1000/192 polyester tire yarn is made using the continuous spin draw process illustrated in FIG. 1, and a coating composition buffered to an alkaline pH, the coating composition being as follows:

0.1% sodium carbonate
5% glycidyl ether made from epichlorohydrin and glycerine (epoxide equivalent 140–160)
5% spin finish containing approximately 60% of dimethylpolysiloxanes (average molecular weight 2000)
5% spin finish containing 75% ethoxylated sorbitan monooleate (20 moles polyoxyethylene) and 25% ethoxylated octophenol (12 moles polyoxyethylene)

The resultant freshly fully drawn yarn was twisted to give a 3 ply 9 x 9 cord which was resorcinol formaldehyde latex dipped and heated at 300° F. for 90 seconds and then 425° F. for 90 seconds to cure the resorcinol formaldehyde latex and heat set the cord. The cord was then made into a 1" peel sample using commercial pneumatic tire green rubber of Example I and the rubber cured at 300° F. for 30 minutes. The peel strips of this example and of samples from Example I were aged for 6 hours at 325° F. and then pulled. The following results are found at 250° F.:

Example I _____ 16 lb./in., 2
Example II _____ 27 lb./in., 3+

The addition of sodium carbonate pH control clearly improves the heat stability of the product.

EXAMPLE III

1330/192 polyester produced by the spin draw process illustrated in FIG. 1 is fully drawn, twisted to a cord, and epoxy resin treated with and without catalyst. The epoxy resin is applied in all cases in a Litzler Computreater (yarn treating apparatus manufactured by C. A. Litzler Co., Cleveland, Ohio).

| Example No. | Finish on yarn[1] | 1st dip | 1st heat treatment | 2d dip | 2d heat treatment | Adhesion to commercially available green rubber molding stock | |
|---|---|---|---|---|---|---|---|
| | | | | | | 75° F. | 250° F. |
| 3a | Component 1 | 10% component 2, 10% component 3, 80% water. | 300° F., 130 seconds. | RFL[2] | 435° F., 70 seconds. | 21 lb./in. | 7 lb./in. |
| 3b | do | 10% component 2, 7.5% component 4, 7.5% component 5, 75% water. | 350° F., 180 seconds. | RFL | 350° F., 180 seconds. | 22 lb./in. | 10 lb./in. |
| 3c | 5% component 2, 5% component 4, 5% component 5, 85% water. | As for 3a | As for 3b | RFL | As for 3b | 36 lb./in. | 11 lb./in. |
| 3d | 5% component 2, 5% component 4, 5% component 5, 85% water. | do | As for 3a | RFL | As for 3a | 26 lb./in. | 11 lb./in. |
| 3e | 5% component 2, 5% component 4, 5% component 5, 85% water. | As for 3b | As for 3b | RFL | As for 3b | 18 lb./in. | 7 lb./in. |
| 3f | Component 1 | 5% component 2, 10% component 6, 0.1% component 7. | 350° F., 90 seconds. | RFL[2] | 350° F., 90 seconds. | 7 lb./in. | 3 lb./in. |
| 3g | Component 1 | 10% component 8, 0.2% component 7. | do | RFL | do | 17 lb./in. | 9 lb./in. |

[1] See components below:
  Component 1—A mixture of ethoxylated fatty alcohols, sulphonated peanut oils and ethoxylated fatty acid esters.
  Component 2—Glycidyl ether made from epichlorohydrin and glycerine [a triol] (epoxide equivalent 140-160).
  Component 3—Ethoxylated octophenol (12 moles polyoxyethylene).
  Component 4—Spin finish containing approximately 60% of dimethylpolysiloxanes (average molecular weight 2000).
  Component 5—75% ethoxylated sorbitan monooleate (20 moles polyoxyethylene) 25% ethoxylated octophenol (12 moles polyoxyethylene).
  Component 6—50% component 4 and 50% component 5.
  Component 7—A branched chain polyethyleneimine with an average molecular weight of 300.
  Component 8—Glycidyl ether made from epichlorohydrin and pentaerythritol (epoxide equivalent 110-125).
[2] Resorcinol formaldehyde latex.

The cord was then tested for adhesion using commercial pneumatic tire green rubber. These examples show that even with epoxy primed cord epoxy resin applied with and without catalyst gives very poor adhesion when the yarn to which the epoxy resin is applied is not underdrawn yarn and hence the epoxy resin cannot be exposed to virgin surfaces.

EXAMPLE IV

Example I is repeated except that the adhesive primer/spin finish epoxy resin is changed to that spin finish shown below.

| Example | Adhesive primer/spin finish | Adhesion to commercially available green rubber molding stock | |
|---|---|---|---|
| | | 75° F. | 275° F. |
| 4a | 5% component 1,[1] 5% component 2,[2] 5% component 3,[3] 85% water. | 64 lb./in., 3−. | 30 lb./in., 3−. |

[1] Glycidyl ester made from epichlorohydrin and ortho phthalic anhydride (epoxide equivalent 155).
[2] 75% ethoxylated sorbitan monooleate (20 moles polyoxyethylene), 25% ethoxylated octophenol (12 moles polyoxyethylene).
[3] Spin finish containing approximately 60% dimethylpolysiloxanes (average molecular weight 2000).

| Example | Adhesive primer/spin finish | Adhesion to commercially available green rubber molding stock | |
|---|---|---|---|
| | | 75° F. | 275° F. |
| 4b | 10.5% component 1,[1] 4.75% component 2,[2] 5% component 3,[3] 85% water. | 64 lb./in., 3. | 33 lb./in., 3−. |

[1] An emulsion containing 60% glycidyl ether from bisphenol A and epichlorohydrin and 5% "F68" (supplied by Wyandotte Chemicals), prepared by condensing ethylene oxide onto polyoxypropylene (molecular weight 8350).
[2] 75% ethoxylated sorbitan monooleate (20 moles polyoxyethylene), 25% ethoxylated octophenol (12 moles polyoxyethylene).
[3] Spin finish containing approximately 60% of dimethylpolysiloxanes (average molecular weight 2000).

The good adhesion results are indicative of the invention being reasonably independent of the type of epoxy resin employed.

EXAMPLE V

Example II is repeated except that the adhesive primer/spin finish is changed to that shown below:

| Example | Adhesive primer/spin finish | Adhesion to commercially available green rubber molding stock | |
|---|---|---|---|
| | | 75° F. | 275° F. |
| 5a | 5% component 1,[1] 10% component 2,[2] 85% water. | 47 lb./in., 3+. | 46 lb./in., 3−. |

[1] Glycidyl ether made from epichlorohydrin and glycerine (a triol) (epoxide equivalent 140-160).
[2] 75% ethoxylated sorbitan monooleate (20 moles polyoxyethylene), 25% ethoxylated octophenol (12 moles polyoxyethylene).

The good adhesion results are indicative of the invention being reasonably independent of the type of lubricant employed.

EXAMPLE VI

A polyethylene terephthalate polymer batch is prepared as follows: 1550 grams of dimethylene terephthalate and 1100 milliliters ethylene glycol are placed in a distillation flask, fitted with a reflux column. The mixture is heated to 160° C. after which 0.015% by weight of zinc acetate dihydrate is added as an ester interchange catalyst. The ester interchange reaction is continued until 640 milliliters of methanol have been evolved and collected. 0.04% by weight of antimony trioxide polycondensation catalyst is then added, together with 0.5% by weight of titanium dioxide as a delustrant, and the batch then transferred to an autoclave. The temperature of the batch is raised to 285° C. and the autoclave is simultaneously evacuated to a vacuum corresponding to 0.1 mm. of mercury. The polycondensation is allowed to continue until the electric power requirements of the stirrer motor indicate that a suitable molecular weight has been reached. The autoclave is then pressurized to 30 p.s.i.g. with dry nitrogen and 14.0 grams 1,2-epoxy-3-phenoxy propane is added to the melt. After ten minutes stirring under pressure, the autoclave is evacuated to remove excess epoxide. The polymer is found to have an intrinsic viscosity of 0.671 and a very low free carboxyl end group concentration of 6.0 equivalence/$10^6$ gram of polymer. The polymer is then processed into 1330/192 polyester tire yarn according to the procedure set forth in Example I. Epoxy resin finish is applied to the yarn according to the process set forth in Example I, and the resultant yarn formulated into 3 ply 8 x 8 cord which is resorcinol formaldehyde latex dipped and treated according to the procedure set forth in Example I. Upon conducting peel tests on the finished sample, it is found that adhesion results were at least equal to the cohesive strength of the rubber, thereby illustrating the independence of the process from free carboxyl end group concentration.

EXAMPLE VII

The procedure of Example I is repeated except that the finish is as follows:

5% component 1
5% component 2
90% water
Component 1—spin finish containing approximately 60% of dimethylpolysiloxanes (average molecular weight 2,000)

Component 2—75% ethoxylated sorbitan monooleate (20 moles polyoxyethylene) 25% ethoxylated octophenol (12 moles polyoxyethylene)

The epoxy resin is applied as an emulsion containing
40% component 1
10% ethoxylated octophenol
50% water
Component 1—glycidyl ether made from epichlorohydrin and glycerine (a triol) (epoxide equivalent 140–160)

The epoxy resin application is made intermediate the first and second pair of draw rolls. When the sample cord is made into 1″ peel samples, adhesion results at 250° F. are found to be 17 pounds per inch. The drop in adhesion is attributable to the lesser degree of drawing which takes place subsequent to application of the epoxy resin. The lesser degree of drawing exposes less fresh surface to the epoxy coating.

EXAMPLE XIII 1300 denier fully drawn polyethylene terephthalate yarn having 8.18 turns per inch is three plied, the plying twist being 7.99 turns per inch, the resulting cord having a linear density denier of 3516, a breaking strength of 69 pounds, a tenacity of 8.91 grams per denier and an elongation at the break of 17%. The cord is then processed through a Litzler Computreater (yarn treating apparatus manufactured by C. A. Litzler Co., Cleveland, Ohio) at a line speed of 20 yards per minute. The epoxy resin coating composition of Example I is then applied in a first dip. The coated cord is then passed into a first zone at a temperature of 350° F. for 180 seconds with 0% stretch. The cord is then dipped in a resorcinol-formaldehyde-latex bath and then passed into a second zone at a temperature of 350° F. for 180 seconds at 0% stretch. The cord is found to have a breaking strength of 71.1 lbs., an elongation at the break of 18.1% and a strength retention of 103%. When peel adhesion test samples are formulated from thus prepared cord, the peel adhesion at 75° F is found to be 30 pounds per inch and at least 250° F. to be 12 pounds per inch.

EXAMPLE IX

3500/7 (500 denier per filament) yarn is made, using the continuous spin draw process illustrated in FIG. 1, and the process as set forth in Example I, except that an epoxy coating composition is employed, having the following composition:
10% glycidyl ether made from epichlorohydrin and aliphatic triol (epoxide equivalent 138–153)
0.3% emulsifier prepared from condensing ethylene oxide onto polyoxypropylene
89.7% water The resultant yarn is twisted to give a 2 turn per inch cord and treated for adhesion according to the procedure set forth in Example I. Peel tests are found to give the following adhesion results: 75° F., 47 lb./in., 3+; 200° F., 38 lb./in. 3—. The yarn is found to have a carboxyl end group concentration of 44 Ue./g.

EXAMPLE X

Example II is repeated except that no resorcinol formaldehyde latex dip is applied. The cord is made into a 1″ peel sample using a direct bonding rubber having the following composition:

| | Parts |
|---|---|
| Standard Malaysian rubber | 70 |
| Oil extended styrene butadiene rubber | 30 |
| Carbon black | 30 |
| Fumed SiO$_2$ | 15 |
| Resorcinol | 2.5 |
| Zinc oxide | 5 |
| Stearic acid | 2 |
| Hexamethylmethoxymelamine | 5 |
| Benzothiazole disulfide | 1 |
| Antioxidant | 1 |
| Sulfur | 2.5 |

The sample is cured for about 40 minutes at about 300° F. and is found to give the following results: 75° F., 32 lb./in.; 250° F., 40 lb./in.

As a control, a sample which is identical in all respects except that in place of the epoxy resin containing bath, the following bath is employed:

16% of a mixture of ethoxylated fatty alcohols, sulphonated peanut oils and ethoxylated fatty acid esters When this sample is cured for about 40 minutes at about 300° F., the following adhesion results are found: 75° F., 21 lb./in.; 250° F., 22 lb./in.

As can be seen, the application of the epoxy resin coating to the undrawn yarn greatly increases the adhesion of the yarn to direct bonding rubber even without the application of a resorcinol formaldehyde latex dip.

While the examples set forth herein have referred to rubber stock as commercially available green rubber, it should be understood that the improvements obtained by the process of this invention are substantially independent of the composition of the commercially available green rubbers. A representative example of a commercial green rubber is as follows:

| Rubber master batch: | Parts |
|---|---|
| Styrene butadiene rubber | 50 |
| Natural rubber | 50 |
| Carbon black (FEF) | 50 |
| Petroleum oil | 10 |
| Zinc oxide | 5 |
| Stearic acid | 2.5 |
| | 167.5 |

The rubber master batch is then compounded into a final green rubber which is as follows:

| Final rubber: | |
|---|---|
| Rubber master batch | 100 |
| Sulfur | 2.2 |
| Benzothiazole disulfide | 2.0 |

The peel adhesion test mentioned herein is carried out substantially as follows: a layer of green rubber is wrapped around a wind-up drum. This is followed by a layer of cord test sample wound onto the drum, each wind being as closely spaced as possible. Two sections are then cut from the drum and are sandwiched with a sheet of green rubber so that each of the two cord layers are faced with rubber. After curing in a steam heated press, the samples are cut into strips and pulled apart under heat on an Instron tensile tester (precision materials testing instrument manufactured by Instron Corp., 2505 Washington St., Canton, Mass.). The average number of pounds to pull the cord layers apart is the measure of the peel resistance of the sample. The procedure for building the peel strip is as follows: pace a 1″ strip of masking tape, tacky side up, over the desired area of a wind-up drum. Cover the windup drum with approximately 21″ lengths of calendered rubber, using a butt joint along the length of the masking tape. Paint the rubber strip with xylene, and lay yarn or cord down on the rubber with each wind being as closely spaced as possible. After a three and one-quarter inch width of fabric has been laid down, it is secured with another small tab of rubber. Pressure is then applied to the fabric by means of the metal roller and the fabric is secured at the splice with another piece of masking tape. The fabric is then cut at the splice and removed from the drum. Samples are then cut into six 3-inch squares. Two pieces of green rubber are then cut into three 3-inch squares. Three pieces of Holland cloth are also cut 3″ x 1″. One 3-inch square of fabric, cords up, is placed on a table top. On top of this rubber laminated fabric, one 3-inch square of green rubber is laid. The 1″ x 3″ strip of Holland cloth is placed on the furthermore top of the green rubber aligning the edges. Another 3-inch square of rubber laminated fabric is placed on top of the Holland cloth with the cords of the laminate placed down. After assuring that the cords of the fabric are parallel with each, the sample is ready for curing. The curing is accomplished by preheating a steam heated press to 330° F. An empty peel mold is placed in the press, and steamed for 20 minutes. The sample is then placed in one of the four mold cavities of the peel mold with the remaining three cavities containing dummy samples. The mold with the top in place is held in the press for fifteen minutes at 300° F. with four tons of pressure.

After fifteen minutes, the mold is removed from the press. The Holland cloth is removed so that cord layers at the sample extremity are exposed. Measurements are made in an Instron machine to determine pounds of pull necessary to delaminate the two cord layers of the sample, the jaws of the Instron machine grasping the exposed ends of the cord layer.

In addition to expressing results as the force required to pull the test specimen apart, a visual rating of the pulled sample is given according to the following scale:

Visual:
  3+ Deep rubber failure
  3  95 to 100% rubber failure
  3− 80 to 95% failure
  2+ To 80% failure
  2  60% rubber failure
  2− To 40% failure
  1+ 20% rubber failure
  1  10% rubber failure
  1− Dip to rubber failure
  0  Dip to cord failure As can be noted from a review of FIG. 3 of the drawings wherein peel adhesion in pounds per inch at 250° F. is plotted against percent draw of the polyester yarn at point of epoxy application, the point of epoxy application is critical to the invention. Turning to the point plotted as Example IX, it should be noted that the peel adhesion of 12 pounds is obtained when the epoxy resin is applied to the substantially fully drawn yarn whereas when the epoxy resin is applied to the substantially undrawn yarn as illustrated by Example I, a peel adhesion of 30 pounds is obtained. Intermediate these two extremes is the partially drawn yarns of Example VII wherein an improvement is obtained over the adhesion of the fully drawn sample, but less than that exhibited by the substantially undrawn sample.

Having thus disclosed the invention, what is claimed is:

1. In a spin draw process for preparing polyester filamentary material substrate surface for subsequent rubber adhesion, the improvement comprising increasing said substrate's virgin surface area by applying to the freshly spun essentially undrawn polyester filamentary material a coating composition containing an uncured epoxy resin having more than one epoxide group per molecule and thereafter continuously hot drawing the coated polyester extrudate at least 1.2 times along the length, said improvement occurring in the absence of a curing agent.

2. The process of claim 1 wherein said polyester filamentary material is polyethylene terephthalate filamentary material.

3. The process of claim 1 wherein said coating composition contains a yarn lubricating agent.

4. The process of claim 1 wherein said coating composition has a basic pH.

References Cited
UNITED STATES PATENTS

| | | | |
|---|---|---|---|
| 2,903,381 | 9/1959 | Schroeder | 117—138.8 F |
| 3,297,467 | 1/1967 | Macura et al. | 117—47 A |
| 3,297,468 | 1/1967 | Macura et al. | 117—47 A |
| 3,383,242 | 5/1968 | Macura et al. | 117—138.8 F |
| 3,642,518 | 2/1972 | Miki et al. | 117—7 |
| 3,690,926 | 9/1972 | Wampetich et al. | 117—77 |
| 3,738,864 | 6/1973 | Altau | 117—138.8 F |
| 3,460,336 | 8/1969 | Collingwood et al. | 57—140 |
| 3,481,136 | 12/1969 | Timmons et al. | 57—164 |
| 3,549,740 | 12/1970 | Schwarz | 264—137 |
| 3,561,937 | 2/1971 | Matthews | 264—178 F |

FOREIGN PATENTS

| | | | |
|---|---|---|---|
| 1,469,111 | 6/1970 | Germany | 264—210 F |
| 43/23,875 | 10/1968 | Japan | 266—210 F |

JAY H. WOO, Primary Examiner

U.S. Cl. X.R.

117—7, 47, 138.8 F; 152—359; 156—330; 161—184; 260—137